(12) United States Patent
Greway

(10) Patent No.: US 6,688,013 B2
(45) Date of Patent: *Feb. 10, 2004

(54) ELECTROLYTIC-TILT-SENSOR

(75) Inventor: Charles E. Greway, Huntingdon Valley, PA (US)

(73) Assignee: The Fredericks Company, Huntingdon Valley, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/021,822

(22) Filed: Dec. 13, 2001

(65) Prior Publication Data

US 2003/0110652 A1 Jun. 19, 2003

(51) Int. Cl.⁷ .................................................. G01C 9/06
(52) U.S. Cl. ................. 33/366.21; 33/366.15; 33/390
(58) Field of Search ............................ 33/340, 366.11, 33/366.15, 366.18, 366.19, 366.21, 366.22, 366.25, 366.26, 390

(56) References Cited

U.S. PATENT DOCUMENTS

| 2,713,726 | A |   | 9/1955  | Dixson |
|-----------|---|---|---------|--------|
| 3,290,786 | A |   | 12/1966 | Parkin |
| 3,487,303 | A |   | 12/1969 | Remington |
| 3,843,539 | A | * | 10/1974 | Willing et al. ............. 252/62.2 |
| 4,583,296 | A |   | 4/1986  | Dell'Acqua |
| 4,707,927 | A | * | 11/1987 | Hiyama ..................... 33/366.19 |
| 5,237,753 | A |   | 8/1993  | Carlson et al. |
| 5,612,679 | A |   | 3/1997  | Burgess |
| 5,625,955 | A |   | 5/1997  | Han |
| 5,630,280 | A |   | 5/1997  | Crossan, Jr. |
| 5,680,708 | A |   | 10/1997 | James |
| 5,852,878 | A |   | 12/1998 | Seipp, Jr. et al. |
| 5,930,907 | A |   | 8/1999  | Ogawa et al. |
| 6,247,239 | B1| * | 6/2001  | Shijo et al. ............... 33/366.11 |
| 6,249,984 | B1| * | 6/2001  | Barsky et al. ........... 33/366.15 |
| 6,442,855 | B2| * | 9/2002  | Takeuchi et al. ......... 33/366.19 |

FOREIGN PATENT DOCUMENTS

| DE | 4025184 A1 | 8/1990 |
|----|------------|--------|
| EP | 0706 028   | 4/1996 |
| GB | 937 162    | 9/1963 |

OTHER PUBLICATIONS

International Search Report issued on Mar. 18, 2003 by the International Searching Authority in in copending PCT Application PCT/US02/40039.

* cited by examiner

Primary Examiner—Diego Gutierrez
Assistant Examiner—Amy R. Cohen
(74) Attorney, Agent, or Firm—Dilworth & Barrese, LLP

(57) ABSTRACT

An electrolytic tilt sensor is disclosed which comprises a containment envelope having a metallic container and a header, the envelope defining a chamber and having at least one pair of apertures, an electrolytic solution partially filling the chamber, and at least one pair of electrodes, each electrode including an electrically active, transverse portion positioned within the chamber in a general horizontal alignment with one another defining a tilt axis, and a lead portion extending to the exterior of the envelope through the respective aperture. The tilt sensor may further include a sealing material disposed in each aperture of the providing a substantial fluid-tight seal about the respective electrode.

15 Claims, 5 Drawing Sheets

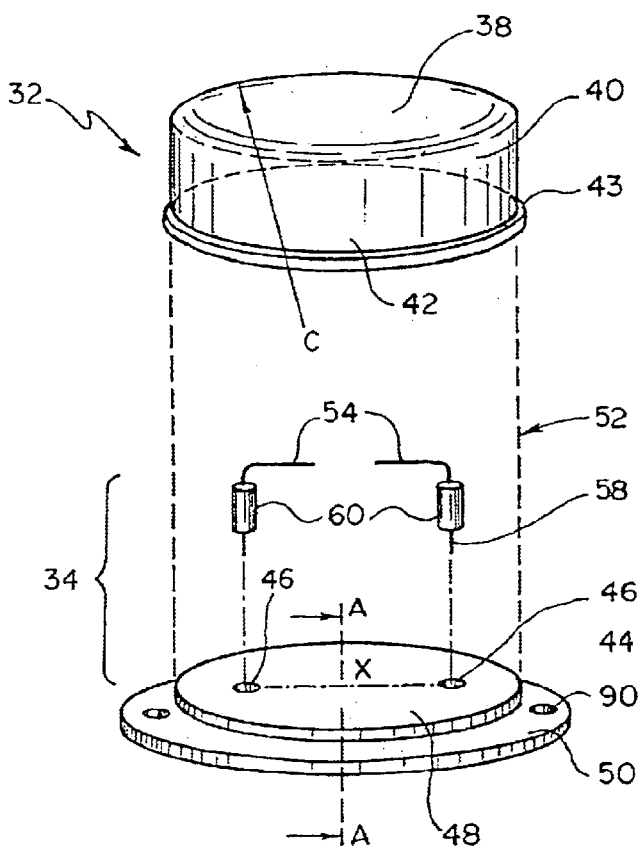
FIG. 4
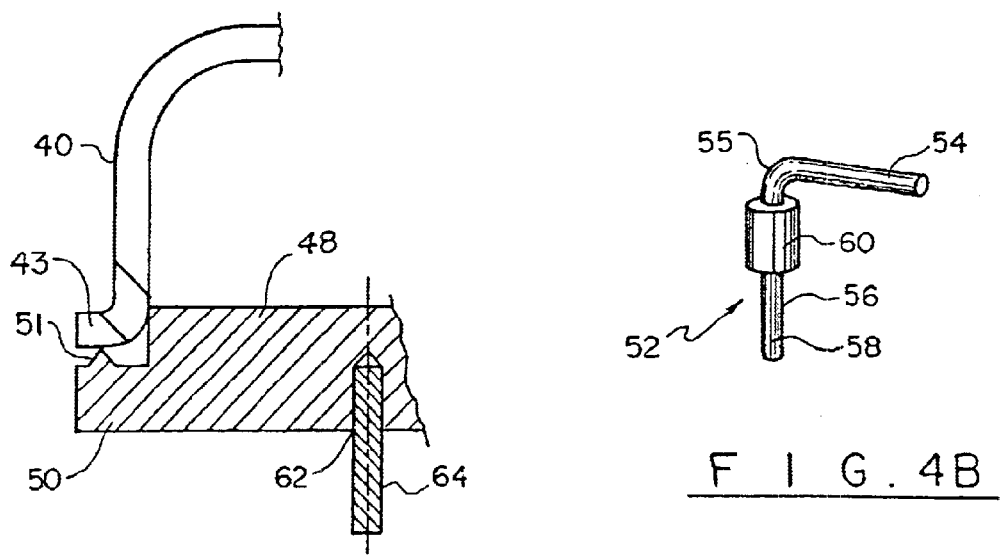
FIG. 4A
FIG. 4B

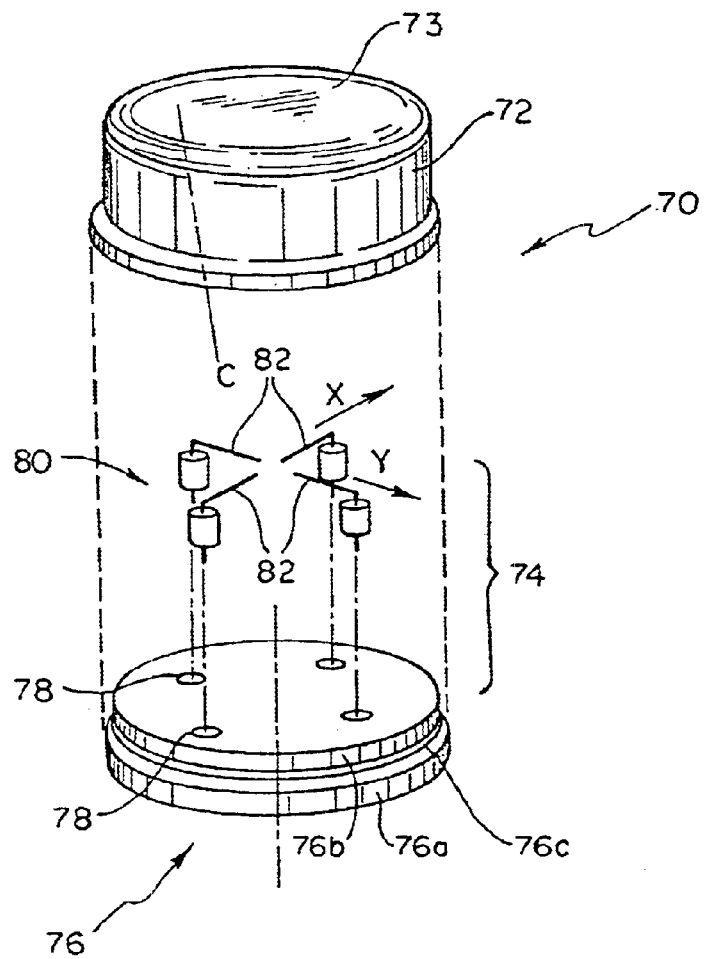
F I G. 5
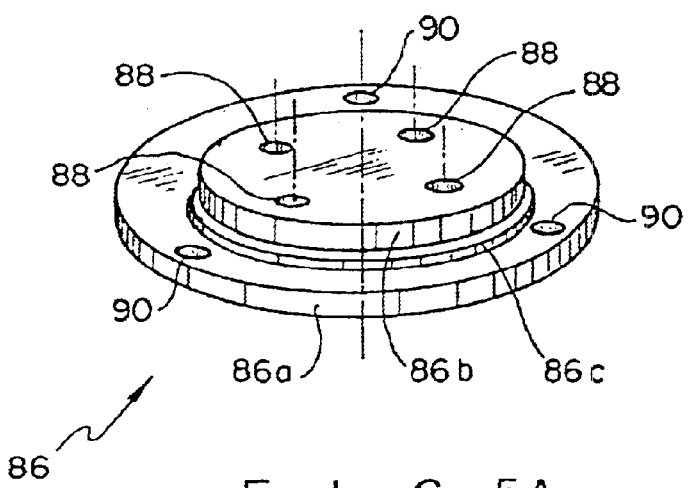
F I G. 5A

ELECTROLYTIC-TILT-SENSOR

FIELD OF THE INVENTION

The present invention relates generally to electrochemical devices. In particular, the invention relates to an electrolytic tilt sensor with mechanical advantage and a method of producing the electrolytic tilt sensor.

BACKGROUND OF THE INVENTION

Electrolytic tilt sensors were originally conceived for weapons delivery and aircraft navigation and are now used in applications such as oil rig leveling, bore-hole angling, construction laser systems, marine stabilization, automotive wheel alignment, seismic and geophysical monitoring, virtual reality systems, and robotic manipulators, etc.

Electrolytic tilt sensors provide output voltage proportional to tilt angle and a phase indicative of tilt direction when configured in an appropriate electrical circuit. An electrolytic tilt sensor typically includes a glass envelope or non-conductive housing that is partially filled with an electrolytic solution, and a plurality of conductive electrodes, including one common electrode, which are at least partially immersed in the electrolytic solution. A portion of the cell which remains unfilled defines a gaseous bubble, which shifts as the cell is tilted, also causing the electrolyte to shift. Consequently, the electrodes become more or less immersed by the electrolyte as the bubble shifts. This shift provides a change in electrode coverage area which results in impedance change between any one electrode and the common electrode. When the tilt sensor electrodes are configured as part of an appropriate electrical circuit, the angle of tilt may be correlated to an output voltage of the circuit.

The geometric configuration of the enclosure and the arrangement and shape of the electrodes affect the quality and performance of each tilt sensing device, including linearity and sensitivity of the output signal. Various geometric configurations of enclosures of these devices have been disclosed in the prior art; for example, U.S. Pat. No. 2,713,726 discloses a rectangular enclosure; U.S. Pat. No. 3,487,303 discloses a spherical housing; U.S. Pat. No. 3,823,486 discloses a housing having a toroidal configuration; and U.S. Pat. No. 5,170,567 discloses a cylindrical housing.

A conventional electrolytic tilt sensor for use in a relatively narrow operating range (i.e., "narrow angle" tilt sensor) is illustrated in FIG. 1. The narrow angle tilt sensor 10 includes a tubular or "banana shaped" glass envelope housing 12, active electrodes 14a, 14b and common electrode 14c extending into the interior of the envelope 12, an electrolytic solution 16 surrounding at least a portion of the electrodes 14a, 14b and all of common electrode 14c, and a vapor bubble 20. There is typically a hermetic seal between the envelope and the electrodes, so that the electrolytic solution and the vapor bubble remain completely within the envelope.

The vessel configuration, electrolyte, electrode arrangement and number of electrodes may be varied to provide the desired operating characteristic. The electrodes may be comprised of platinum, and the electrolyte may be a solution of potassium iodide dissolved in ethanol. The curvature M of the housing may determine the operating and sensitivity range of the device. Alternating current ("A.C.") is applied to electrolytic tilt-sensors. FIGS. 2 and 2A show two alternative typical electrical circuits to be used with his tilt sensor.

Known shortcomings associated with conventional envelope tilt sensors include difficulties in manufacturing the sensor. Moreover, tilt sensor manufacture requires a significant degree of skill, fixturing, and labor intensive handwork and art on the part of the operator to achieve the desired parameters. The tolerances of the glass housings during the process can vary greatly. This results in either a higher reject rate and/or a greater range of mechanical and electrical tolerance in the parts. In addition, the tilt sensor components are relatively fragile due to their glass construction and must be handled with caution. They are also costly to manufacture and generally use precious metal electrodes.

Electrolytic tilt sensors with conductive envelopes, such as metallic or partially metallic envelopes, have been disclosed in the prior art (see, for example U.S. Pat. No. 5,630,280 to Crossan, Jr. and U.S. Pat. No. 6,249,984 to Barsky, et al.). The Crossan, Jr. tilt sensor (U.S. Pat. No. 5,630,280) includes four arcuate sensing electrodes extending into a spherical chamber defined by the enclosure. The enclosure includes a metallic containment housing and a header made of a non-conductive material, such as glass. The metallic containment housing functions as the common electrode while the header secures the sensing electrodes and insulates them from the metallic containment vessel.

The Crossan, Jr. tilt sensor is for use in a wide operating ranges and provides certain advantages, such as enhanced linearity of output voltage resulted from arcuate electrodes in association with the spherical chamber.

The tilt sensor disclosed in Barsky, et al. (U.S. Pat. No. 6,249,984), the entire contents of which are herein incorporated by reference, includes a metallic envelope, a metal header welded to the envelope, and a plurality of electrodes located within the envelope. Each of the electrodes has a general straight configuration and is vertically mounted through the header while they are insulated by glass to metal seals. Similar to Crossan, Jr., this tilt sensor is also for use in a relative wide range of tilt angle.

Accordingly, the present invention is directed to further improvements and enhancements of the prior art tilt sensors, by providing an electrolytic tilt sensor for use in a narrow tilt angle application.

SUMMARY OF THE INVENTION

In accordance with one preferred embodiment, the electrolytic tilt sensor includes a containment envelope having a metallic container and a header. The envelope defines a chamber and has at least one pair of apertures formed there through. The tilt sensor further includes an electrolytic solution at least partially filling the chamber, and at least one pair of electrodes. Each electrode includes an electrically active, transverse portion positioned within the chamber in a general parallel relation with the inner surface of the top portion of the metallic container and a lead portion extending to the exterior of the envelope through the respective aperture. A sealing material is disposed in each aperture of the envelope for sealing and insulative support of the respective electrode relative to the envelope.

In one preferred embodiment, the electrolytic tilt sensor of the invention includes one pair of electrodes with the transverse portions in alignment to define a single tilt axis. In another embodiment, the electrolytic tilt sensor of the invention includes two pairs of electrodes with the transverse portions in quadrature alignment to define dual tilt axes.

The present invention further discloses a method of producing an electrolytic tilt sensor.

BRIEF DESCRIPTION OF THE DRAWINGS

Preferred embodiments of the invention are described herein with reference to the drawings, wherein:

FIG. 4 is an exploded perspective view of the tilt sensor shown in FIG. 3;

FIG. 4A is an enlarged partial cross-sectional view of the tilt sensor, taken along the line A—A of FIG. 4, illustrating a lead connected to a header, and a welding ridge between the container and header;

FIG. 4B is an enlarged perspective view of one of the electrodes with insulative/glass beads formed thereon;

FIG. 5 is an exploded perspective view of an alternate embodiment of the electrolytic tilt sensor;

FIG. 5A is a perspective view illustrating an alternative configuration of the header having an enlarged flange portion.

DETAILED DESCRIPTION OF PREFERRED EMBODIMENTS

Figure 1:
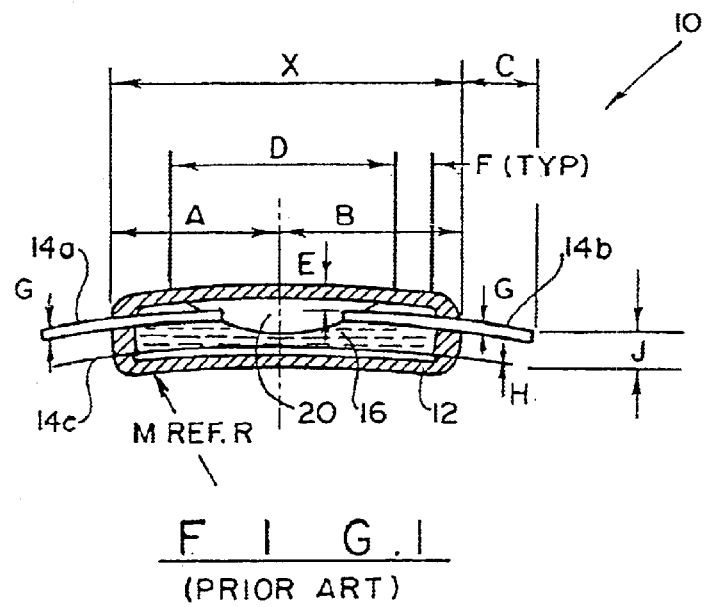
FIG. 1 is a cross-sectional view of a conventional electrolytic tilt sensor.
Figure 2:
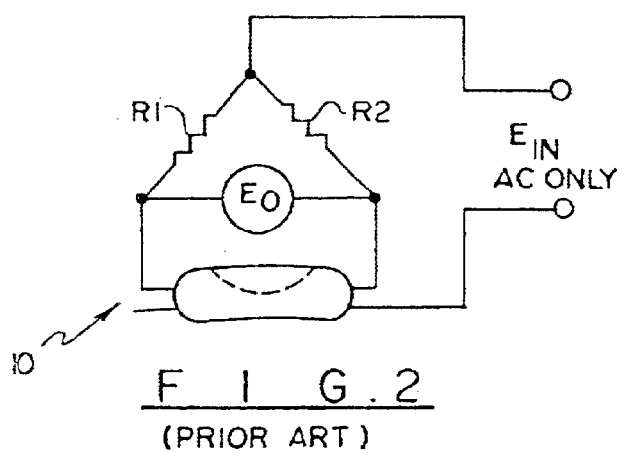
FIGS. 2 and 2A are electrical circuits incorporating the tilt sensor of FIG. 1.
Figure 2A:
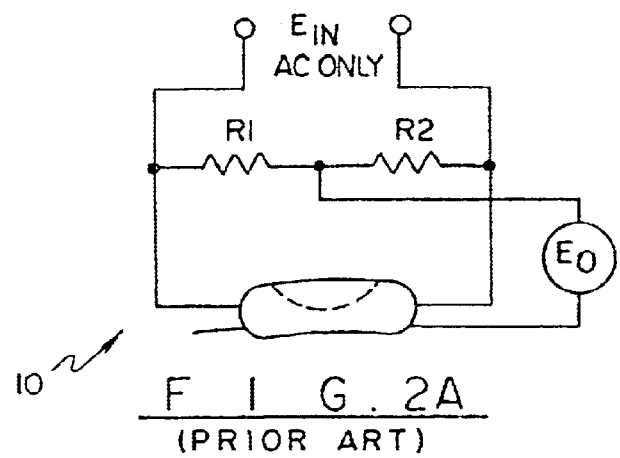
Figure 3:
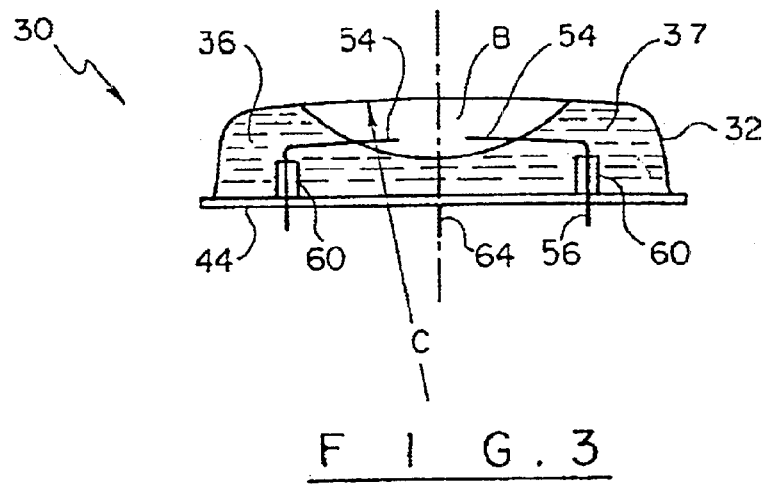
FIG. 3 is a longitudinal cross-sectional view of an electrolytic tilt sensor of the present invention.

Referring now to the drawings, FIGS. 3—4B illustrate an electrolytic tilt sensor 30 according to one embodiment of the present invention. The electrolytic tilt sensor 30 includes metallic container 32 and header-electrode assembly 34 which is connected in fluid tight relation to the metallic container 32. The assembled components provide a containment envelope defining chamber 36. Chamber 36 is partially filled with electrolytic solution 37 and has a gaseous bubble represented by reference letter "B".

Figure 3A:
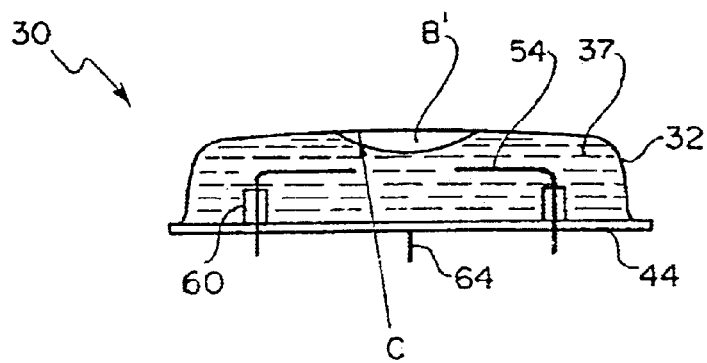
FIG. 3A is a longitudinal cross-sectional view similar to FIG. 3, illustrating an alternative construction of the tilt sensor in which the electrodes are completely immersed within the electrolytic solution.
Figure 3B:
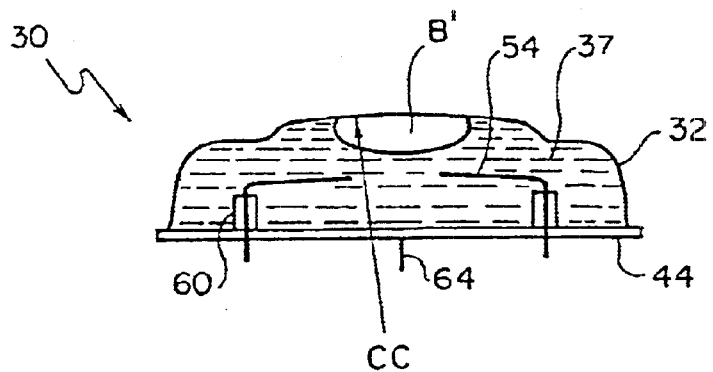
FIG. 3B is a longitudinal cross-sectional view similar to FIG. 3, illustrating alternating construction of the tilt sensor with the top wall portion having a compound inner curvature.

With particular reference to FIG. 4, metallic container 32 includes top wall portion 38 and side wall portion 40 depending from the top wall portion 38. Side wall portion 40 defines opening 42 which faces the header-electrodes assembly 34. It is referred that the metallic container 32 is formed of sheet metal. PreferabLy, the side wall portion has a general hemi-cylindrical or ovoid-like configuration and the top wall portion has an arcuate or round inner surface along its length. The inner surface of the top wall may have a curvature "C" with a constant radius as shown in FIGS. 3 or 3A, or it may alternatively have a compound curvature "CC" with a varying radius as shown in FIG. 3B. The curvature "C" or compound curvature "CC" of the inner surface of the top wall may be determined by the particular design of the sensor and relates generally to the sensitivity, linearity and/or operating range of the device. The curvature is also related to the dynamics of the fluids electrolyte.movement. The side wall portion may be another shape, such as rectangular, radiused, channeled or other axially preferred symmetric shapes. The lower end of the side wall portion 40 terminates at an outwardly-turned lip or flange 43. Although it is preferred to provide a flange to facilitate attachment to the header assembly, it need not be provided. In an alternative embodiment, the outer surfaces of the metallic container 32 may include a non-conductive outer layer such as a plastic shell, a protective polymer coating, or the like. The metallic container is preferably stamped from or formed of commercially available material, such as Nickel, stainless steel or other metals.

Header-electrodes assembly 34 includes header 44 with two apertures 46 formed therein. Header 44 includes base 48 configured and dimensioned to be received within opening 42 of the metallic container 32. Base 48 has a circumferential flange 50, which contains a plurality of holes 90 for mounting the device to a desired application. A hermetic, continuous seal is provided at the interface between flanges 43 of container 32 and flange 50 of header 44 preferably by welding. The preferred procedure for welding flanges 43, 50 to one another is to incorporate an annular welding ridge 51 (FIG. 4A) on flange 50. During welding, the welding ridge 51 concentrates the welding current and is thereby melted to form a weld bead that joins the header 44 to the metallic container 32 and provides a hermetic seal. The header 44 is preferably made of metallic materials such as nickel, stainless steel or other metals as the container 32. Alternatively, the header may be formed of ceramic material with the cap made electrically conductive. In the case that the header 44 is made of ceramic or the like, it may be bonded to the metallic container 32 by a known bonding method, such as glass frit, glass to metal sealing, or bonding by epoxy adhesive.

The header-electrodes assembly 34 further includes a plurality of glass-beaded electrodes 52 inserted into the respective apertures 46 of the header 44. Electrodes 52 include a bent configuration having electrically conductive, transverse portions 54 that are adapted to be positioned within the chamber 36 in general parallel relation with the inner surface of top wall portion 38 of the container and subject to immersion in the contained electrolytic solution 37. Electrodes 52 further include vertical portions 56 having lead portions 58 extending outside header assembly 34 for connecting the tilt sensor to an appropriate electrical circuit as known in the art. Electrodes 52 are sealing supported and electrically insulated from the header 44 by insulators or glass beads 60 disposed below bent portions 55, where beads 60 are received within apertures 46 of header 44. The actual configurations and dimensions of the electrodes can be, to a certain degree, varied in accordance with the particular objectives of the sensor.

With reference to FIG. 4A, header 44 further includes a receptive cavity 62 on the bottom side, receiving conductive lead 64 which is disposed by welding, soldering or suitable means to connect the containment envelope (i.e., the common electrode) to an exterior electrical circuit. Lead 64 can be alternatively attached to outer periphery of metallic container 32. Electrodes 52 can be made of Kovar, Alloy 52 or a similar material, and preferably coated by precious metal such as platinum or gold. The glass insulators are preferably formed of a material that matches the thermal coefficient of the header and the electrodes. The electrolytic solution 37 can be selected from a group comprising nonaqueous, semi-aqueous and noncorrosive solutions. Preferably, the electrolytic solution is a non-halogenated solution, which generally has a non-deleterious effect on the nonprecious metal components of the preferred embodiment. Halogenated solutions should be used only with pure or clad precious metal components.

It is noted that the chamber 36 is partially filled with the electrolytic solution 37 so that at least some of each transverse portions 54 of the electrodes are exposed to the gaseous bubble "B" as shown in FIG. 3. Alternatively, as shown in FIGS. 3A and 3B, the chamber 36 may be further filled with electrolytic solution so that all of the electrodes are immersed within the solution without allowing the electrodes to penetrate the bubble "B". This configuration is feasible because the metallic container 32 is the common electrode, and may provide some advantages since the electrodes do not interfere with the movement of the bubble due to their non-frictional relationship.

As illustrated in FIG. 4, two sensing electrodes 52 are mounted to header 44 in spaced relation with the transverse portions 54 aligned along a center line "x" of the header leaving an appropriate gap between the distal end portions thereof. The center line "x" defines a tilt axis, with regard to which the degree of tilt is measured by sensing he change in output voltage by the appropriate circuit.

Referring now to FIG. 5, an electrolytic tilt sensor 70 is shown, which illustrates an alternate embodiment of the present invention. Electrolytic tilt sensor 70 is generally similar to the tilt sensor 30 as described herein-above with FIGS. 3–4B, but includes a second pair of electrodes. The tilt sensor 70 includes a metallic container 72 and a header-electrodes assembly 74 connected in fluid tight relation and defining a chamber there-between, which is partially filled with an electrolytic solution in a similar manner as shown in FIGS. 3–3B. Top wall portion 73 of the metallic container 72 is,preferably of round configuration having a curvature "C" or a compound curvature "CC" as similar to that shown in FIGS. 3–3B. The header-electrodes assembly includes a header 76 with four apertures 78 formed therein. The header 76 may include a flange portion 76a and a mounting portion 76b, hermetically sealed with the container 72. An annular welding ridge 76c may be provided for the sealing by the resistance welding mentioned above. The header-electrodes assembly further includes two pairs, i.e., four sensing electrodes 80 with transverse portions 82 aligned in quadrature about the center axis of the chamber. Being located in quadrature, the two pairs of diametrically opposed electrodes define two orthogonal tilt axes, for example, Cartesian "X" and "Y" axes. In this configuration, the output voltages of the sensing electrodes are measured and correlated to one another to provide the angle of tilt regardless of direction. In addition, if a direction reference is established, the output voltages may be further used to determine the direction of tilt. It is noted that the header-electrodes assembly may include three or more pairs of sensing electrodes arranged about the center axis of the chamber and defining a corresponding number of tilt axes in a similar manner described above.

Referring now to FIG. 5A, an electrolytic tilt sensor 70 may optionally include an enlarged header 86. Enlarged header 86 is similar to the header 76 of FIG. 5, except it includes an enlarged flange portion 86a having a plurality of mounting holes 90 formed therein for installing the tilt sensor to the intended applications.

Figure 6:
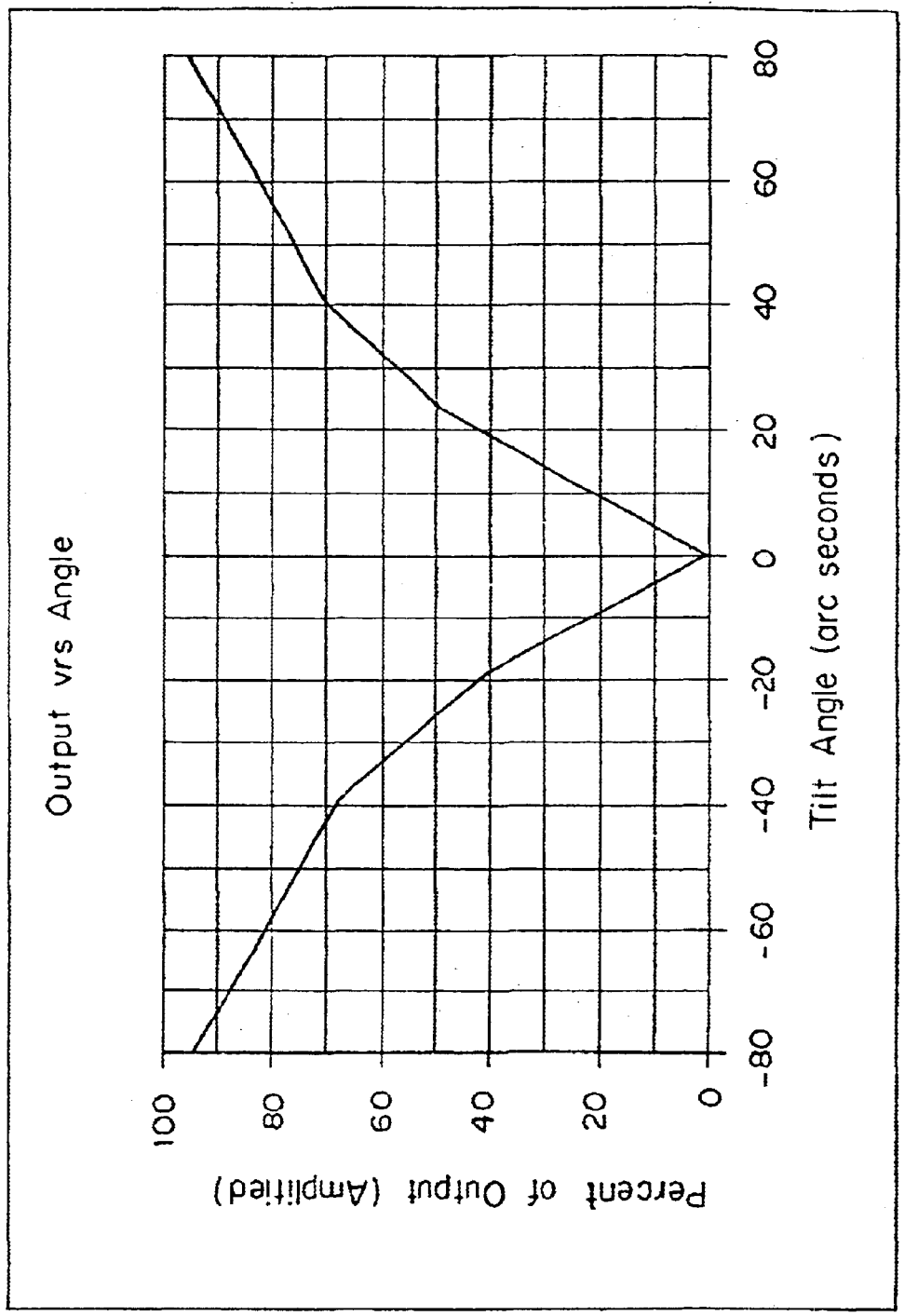
FIG. 6 is an exemplary graph of output versus tilt angle for constant radius version of the tilt sensor.

Referring now to FIG. 6, an exemplary graphical representation of certain performance characteristics of a single axis constant radius tilt sensor of FIGS. 3 or 4 is illustrated. If a compound curvature type (FIG. 3B) is used, the shape of the output curve may be tailored to a specific application.

The process of producing the tilt sensor of the present invention will be described herein.

First, components of the tilt sensor as shown in FIGS. 4 and 5 are produced, including without limitation the metallic containers and headers, preferably by stamping, machining or drawing.

For producing the header assembly, as shown in FIG. 4B, glass beads 60 are packed around the intermediate portions of the electrodes, below the bent portions, using an appropriate fixture. The loaded fixture is then subject to heat at a temperature to profile melt the bead and form a glass-to-metal seal between bead 60 and electrodes 52. For this process, the fixture may-be sent through a conveyor kiln at a preset temperature to form a glass-to-metal seal. The glass-beaded electrodes are then inserted to a predetermined depth into the respective apertures 46 or 78 provided in the header. Again, with appropriate fixtures, the subassembled header-electrodes assembly is subject to heat within a conveyor kiln at a temperature to make a "bridging" beaded electrodes glass-to-metal seal, thereby providing a substantial fluid-tight seal there-between. Alternatively, if a ceramic header is used, the glass-beaded electrodes are sealingly bonded to the header by glass bonding or applying appropriate adhesive, such as epoxy adhesive. A non-aggressive electrolyte is precision metered into the volume of the containers 32 or 72 with the opening side facing up. This fill level determines the tilt angle range and assures a properly sized bubble as described above in connection with FIGS. 3–3B. The header assembly is now placed onto the metallic container, filled properly with electrolyte and welded using a manual, semi-manual, or fully automatic resistance-type welding machine. The welding machine preferably includes an upper electrode for receiving the header assembly and a lower electrode for contacting the metallic container. Alternatively, when a ceramic header is used, it may be sealing bonded to the container by appropriate adhesive, e.g. epoxy adhesive.

One unique advantage of the invention is that the sensor is self-contained, i.e., it may be assembled and the electrolyte introduced into the container without the need for a fill hole. This makes the sensor easier to fabricate, and eliminates the need to seal the fill hole. Absence of a fill hole improves the integrity of the container, and improves the overall reliability of the sensor.

The above-described process is a quick and efficient method of manufacturing an electrolytic tilt sensor according to the present invention. However, other methods of assembly may be used.

Although the invention has been described and illustrated with respect to the exemplary embodiment thereof, it should be understood by those skilled in the art that the foregoing and various other changes, omissions, and additions may be made therein and thereto, without parting from the spirit and scope of the present invention.

What is claimed is:

1. An electrolytic tilt sensor, comprising:
   a containment envelope including a header made of conductive material and a metallic container having a top portion and a side portion depending from the top portion, the envelope defining a chamber and having at least one pair of apertures formed there through;
   an electrolytic solution at least partially filling the chamber; and
   at least one pair of electrodes, each electrode including an electrically active, transverse portion positioned within the chamber in a general parallel relation with inner surface of the top portion of the metallic container, and a lead portion extending to the exterior of the envelope through a respective aperture of the at least one pair of apertures, said transverse portions of said at least one pair of electrodes being in general alignment to define at least one tilt axis.

2. The electrolytic tilt sensor of claim 1 further comprising a sealing material disposed in each aperture of the envelope for providing a substantial fluid-tight seal about the electrode.

3. The electrolytic tilt sensor of claim 1, wherein the tilt sensor has a single pair of electrodes with the transverse portions defining a single tilt axis.

4. The electrolytic tilt sensor of claim 1, wherein the tilt sensor has at least two pairs of electrodes with the transverse portions defining multiple tilt axes.

5. The electrolytic tilt sensor of claim 1, wherein the header is made of non-conductive material.

6. The electrolytic tilt sensor of claim 1, wherein the top portion of the metallic container has an arcuate inner surface.

7. The electrolytic tilt sensor of claim 1, wherein the metallic container is made of a nonpiecious metal.

8. The electrolytic tilt sensor of claim 1, wherein the metallic container further includes an outer layer of non-conductive material.

9. The electrolytic tilt sensor of claim 1, wherein the apertures are located in the header.

10. An electrolytic tilt sensor, comprising:
a containment envelope including a header and a metallic container welded to one another, the metallic container having a top portion and a side portion depending from the top portion, the envelope defining a chamber and having at least one pair of apertures formed there through;
an electrolytic solution at least partially filling the chamber; and
at least one pair of electrodes, each electrode including an electrically active, transverse portion positioned within the chamber in a general parallel relation with inner surface of the top portion of the metallic container, and a lead portion extending to the exterior of the envelope through a respective aperture of the at least one pair of apertures, said transverse portions of said at least one pair of electrodes being in general alignment to define at least one tilt axis.

11. An electrolytic tilt sensor, comprising:
a containment envelope including a header and a metallic container bonded to one another by adhesive, the metallic container having a top portion and a side portion depending from the top portion, the envelope defining a chamber and having at least one pair of apertures formed there through;
an electrolytic solution at least partially filling the chamber; and
at least one pair of electrodes, each electrode including an electrically active, transverse portion positioned within the chamber in a general parallel relation with inner surface of the top portion of the metallic container, and a lead portion extending to the exterior of the envelope through a respective aperture of the at least one pair of apertures, said transverse portions of said at least one pair of electrodes being in general alignment to define at least one tilt axis.

12. The electrolytic tilt sensor of claim 1, wherein the header further includes mounting holes for installation of tilt sensor.

13. The electrolytic tilt sensor of claim 1, wherein the sealing material is glass.

14. The electrolytic tilt sensor of claim 13, wherein the glass forms a glass-to-metal seal with the envelope and the corresponding electrode.

15. A method of producing a header assembly for use with an electrolytic tilt sensor, comprising the steps of:
providing a plurality of electrodes with bent configurations,
providing a header having a plurality of apertures for receiving the plurality of electrodes, and a mass of glass beads;
providing a metallic container bonded or adhered to the header;
placing the glass beads adjacent the bent portions of the plurality of electrodes and applying heat until the glass beads form a glass-to-metal seal;
inserting each of the electrodes into a respective aperture of the plurality of apertures of the header;
heating the header and electrodes to cause the beaded glass to melt to a glass-to-metal seal between the header and the plurality of glass beaded electrodes, thereby securing the plurality of glass beaded electrodes in the housing.

* * * * *